(12) United States Patent
Hessling Von Heimendahl et al.

(10) Patent No.: US 8,956,023 B1
(45) Date of Patent: Feb. 17, 2015

(54) COMBINED WING SCAN AND WINGLET ILLUMINATION LIGHT UNIT AND AIRCRAFT HAVING WINGLET ILLUMINATION

(71) Applicant: Goodrich Lighting Systems GmbH, Lippstadt (DE)

(72) Inventors: Andre Hessling Von Heimendahl, Koblenz (DE); Frank Klein, Langenberg (DE); Sascha Lueder, Rietberg (DE)

(73) Assignee: Goodrich Lighting Systems GmbH (DE)

( * ) Notice: Subject to any disclaimer, the term of this patent is extended or adjusted under 35 U.S.C. 154(b) by 0 days.

(21) Appl. No.: 14/037,913

(22) Filed: Sep. 26, 2013

(51) Int. Cl.
*B64D 47/02* (2006.01)
(52) U.S. Cl.
CPC ..................................... *B64D 47/02* (2013.01)
USPC ......................................................... 362/470

(58) Field of Classification Search
USPC ......................................................... 362/470
See application file for complete search history.

(56) References Cited

U.S. PATENT DOCUMENTS

| | | | |
|---|---|---|---|
| 4,380,788 A * | 4/1983 | Korski | 362/470 |
| 6,963,293 B1 * | 11/2005 | Rast | 340/981 |
| 2003/0058653 A1 * | 3/2003 | Konicke et al. | 362/470 |
| 2012/0140498 A1 * | 6/2012 | Fabbri et al. | 362/470 |
| 2013/0051044 A1 * | 2/2013 | Edmond et al. | 362/470 |
| 2013/0077329 A1 * | 3/2013 | Hessling | 362/470 |
| 2013/0077331 A1 * | 3/2013 | Hessling | 362/470 |

\* cited by examiner

*Primary Examiner* — Laura Tso
(74) *Attorney, Agent, or Firm* — Cantor Colburn LLP

(57) ABSTRACT

A combined wing scan and winglet illumination light unit is disclosed. The light unit has at least one LED and at least one optical structure for shaping a light emission distribution of the combined wing scan and winglet illumination light unit. The wherein the light emission distribution has a first illumination region for illuminating a wing and a wing engine of an aircraft and a second illumination region for illuminating a wing tip winglet of the aircraft.

20 Claims, 2 Drawing Sheets

COMBINED WING SCAN AND WINGLET ILLUMINATION LIGHT UNIT AND AIRCRAFT HAVING WINGLET ILLUMINATION

BACKGROUND OF THE INVENTION

The present invention is in the field of exterior aircraft lighting. More particularly, the present invention is concerned with those exterior aircraft light units that illuminate the aircraft itself.

Exterior aircraft lighting serves a wide range of purposes. On the one hand, there is safety-critical lighting, such as position signalling and take-off/landing lighting. On the other hand, certain lights are provided for marketing purposes. An example of such a light is a fin illumination light, illuminating the vertical structure at the tail of the plane, which is usually provided with the airline's logo.

Modern airplanes increasingly have so-called winglets at the ends of their wings. These winglets are wing tip structures that are angled with respect to the wing profile and extend generally upwards. On the one hand, such winglets reduce lift induced drag caused by wing tip vortices. On the other hand, such winglets also provide an area of the aircraft for advertising and logo placement, with the inward-facing side of the winglets being visible to the passengers within the airplane.

It is generally desirable to improve the visibility of the winglet surfaces in poorly lit conditions, such as during night flights. However, no efficient technology for illuminating the winglets has been provided to date. Accordingly, it would be beneficial to provide illumination of the winglets in an efficient manner.

BRIEF DESCRIPTION OF THE INVENTION

According to the present invention, there is provided a combined wing scan and winglet illumination light unit, which comprises at least one LED and at least one optical structure for shaping a light emission distribution of the combined wing scan and winglet illumination light unit. The light emission distribution comprises a first illumination region for illuminating a wing and a wing engine of an aircraft and a second illumination region for illuminating a wing tip winglet of the aircraft.

The invention makes use of the provision of wing engine scan lights (WESL) in existing aircrafts. These lights may be switched on during flight to illuminate the wing, in particular the front edge thereof, and the wing engine. This allows the pilot to make a visual inspection of the wing and the wing engine. The visual inspection is usually in addition to the outputs of the sensors that provide an automated check of the integrity and functionality of these components. The automated and visual checks inspect—inter alia—whether an undesirable build-up of ice at the wing and/or the wing engine is present.

The invention modifies such existing wing engine scan lights by providing a second illumination region, i.e. a second direction of illumination, for illuminating the winglet of the wing of the aircraft. In this way, the additional illumination capacity is inserted into already existing light unit structures. No additional space has to be provided for a separate winglet illumination light unit. Both the illumination for the wing and the wing engine as well as the illumination for the wing tip winglet may be provided in one housing with one control unit, ensuring a low number of components and high space efficiency. The usage of modern LEDs with high illumination capacity allows for the integration of this combined light unit within a space that was previously only provided for wing engine scan lights.

The invention also allows for replacing existing wing engine scan lights with the inventive combined wing scan and winglet illumination light units. In this way, the illumination can be conveniently adapted, when an aircraft is equipped with wing tip winglets after its original production, i.e. at some later point during its life cycle.

According to the invention, there is also provided an aircraft with an aircraft fuselage, extending from a nose to a tail of the aircraft, a left wing and a right wing, with the left and the right wing each comprising a wing engine and a wing tip winglet. The aircraft further comprises a left side combined wing scan and winglet illumination light unit, disposed between the nose and the left wing on a left side of the aircraft fuselage, and a right side combined wing scan and winglet illumination light unit, disposed between the nose and right wing on a right side of the aircraft fuselage. Each of the left side and the right side combined wing scan and winglet illumination light units has a first illumination region for illuminating the respective wing and wing engine and a second illumination region for illuminating the respective wing tip winglet.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
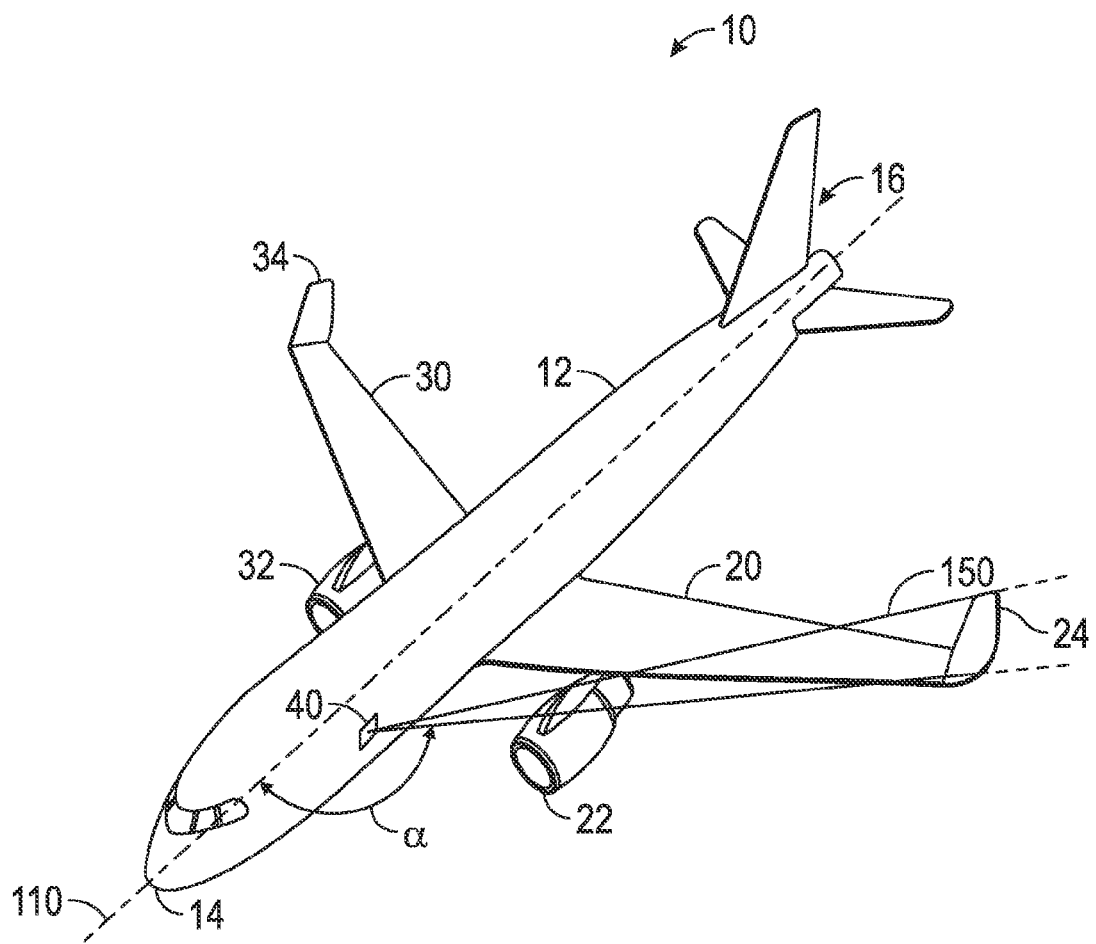
FIG. 1 is a schematic drawing of an exemplary embodiment of an aircraft in accordance with the invention.

FIG. 1 shows an aircraft 10 in a perspective view in accordance with an exemplary embodiment of the invention. The aircraft 10 has a fuselage 12, extending from a nose 14 of the aircraft to a tail 16 of the aircraft. Attached to the fuselage 12, there are provided a left wing 20 and a right wing 30. The left wing 20 carries a left engine 22, while the right wing 30 carries a right engine 32. The left and right engines 22 and 32 are commonly gas turbine engines, but the invention is not restricted thereto.

The left wing 20 has a left wing tip winglet 24, which extends substantially upwards from the remainder of the left wing 20. The right wing 30 has a right wing tip winglet 34, which extends substantially upwards from the remainder of the right wing 30. The wing tip winglets 24 and 34 are provided at the end of the respective wing. The left and right wings 20 and 30 have an airfoil section, extending between the fuselage 12 and the respective winglets 24 and 34, with the airfoil sections providing for the lift of the aircraft in operation.

Each of the winglets 24 and 34 carries an image on its fuselage-facing side (not shown). This image may be a logo of the airline or an advertisement or any other sort of image. These images are generally directed towards the passengers of the plane 10.

The airplane 10 further comprises two combined wing scan and winglet illumination lights units 40, the left one of which being shown in the perspective view of FIG. 1. The left side combined wing scan and winglet illumination light unit 40 is arranged between the nose 14 of the aircraft 10 and the root of the left wing 20. It is arranged substantially in the middle between the nose 14 and the center of the root of the left wing 20. The light unit 40 is provided for illuminating the left wing engine 22, the left wing 20, in particular a front edge of the left wing 20, and the left winglet 24. As will be explained below with reference to FIG. 2, the light unit 40 has dedicated LEDs and optical structures for illuminating the wing engine 22, the wing 20, and the winglet 24. The illumination of the winglet 24 is illustrated by a cone 150 in FIG. 1, which is an illustration of the illumination region for illuminating the winglet. It is understood that an analogous combined wing scan and winglet illumination light unit is provided on the right side of the aircraft fuselage 12. This light unit is adapted to illuminate the right wing engine 32, the right wing 30, and the right winglet 34.

The winglet illumination region 150 has an angle α with the rear-to-front direction 110 of the airplane 10. This angle α is larger than 110°. In this way, white light can be used for illuminating the winglet 24 without interfering with the Federal Aviation Regulation (FAR) for exterior aircraft lights. This regulation requires in particular that white light is emitted from the aircraft towards to the rear only, specifying a 140° angle around the rearwards direction, i.e. a 70° angle with respect to the front-to-rear direction, for the emission of white light only. It is pointed out that the wing and wing engine illumination region has an angle of more than 110° with the rear-to-front direction 110 of the airplane 10 as well.

Figure 2:
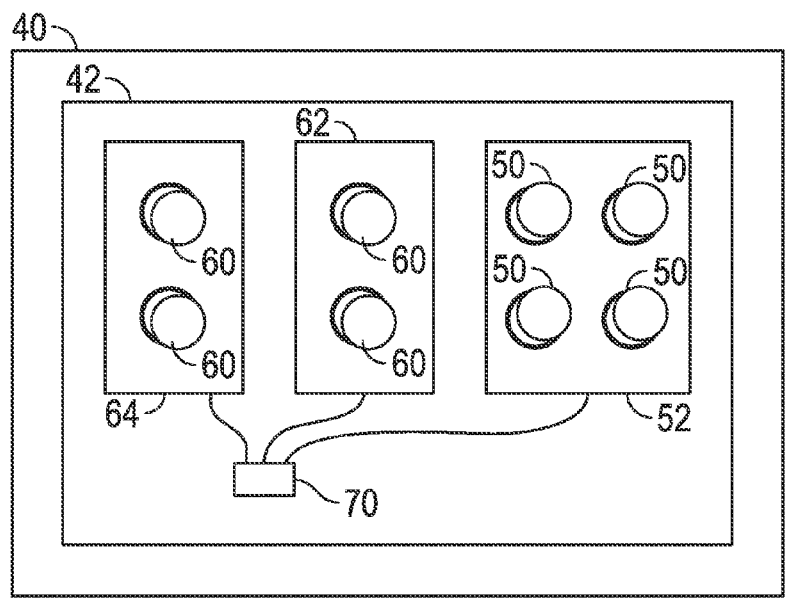
FIG. 2 is a block diagram of an exemplary embodiment of a combined wing scan and winglet illumination light unit in accordance with the invention.

FIG. 2 shows a block diagram of a combined wing scan and winglet illumination light unit 40 in accordance with an exemplary embodiment of the invention. This light unit 40 may be disposed in the aircraft 10 of FIG. 1. However, other embodiments of the light unit are also possible.

The light unit 40 is a combined wing scan and winglet illumination light unit for being disposed on the left side of an airplane. It comprises a light unit case that is covered by a transparent lens cover 42. Below the lens cover 42, there is provided a first subset of LEDs 60 and a second subset of LEDs 50.

The first subset of LEDs 60 comprises four LEDs. Two of these four LEDs 60 are mounted on a first mounting structure 62 and are angled towards the rear and somewhat to the bottom. Their direction is aimed at the front edge of the left wing of the aircraft. The other two of the first subset of LEDs 60 are mounted on a second mounting structure 64 and are also angled towards the rear and to the bottom. Their direction is aimed at the wing engine carried by the left wing of the aircraft. The LEDs of the second mounting structure 64 are angled somewhat more to the bottom than the LEDs of the first mounting structure 62.

The second subset of LEDs 50 also comprises four LEDs. The LEDs 50 are disposed on a third mounting structure 52 and are angled somewhat to the rear and to the top. Their direction is aimed at the left winglet of the aircraft.

While the first subset of LEDs 60 and the second subset of LEDs 50 is angled in the general direction of the respective elements to be illuminated, the transparent lens cover 42 is an optical structure for shaping the desired light intensity distributions for illuminating said elements. For this purpose, the lens cover 42 has three distinct sections, respectively extending above the first mounting structure 62, the second mounting structure 64, and the third mounting structure 52. The particular characteristic of the resulting illumination regions will be discussed with respect to FIG. 3.

It is pointed out that a variety of optical structures may be used for shaping the light emission distribution. For example, it is possible that the cover 42 does not have any lens characteristics and is purely transmissive for the light as it hits the cover 42. In that case each of the mounting structures 52, 62 and 64 may have a respective lens attached thereto. These lenses may then shape the desired light emission characteristics for the respective elements to be illuminated. It is also possible that each LED has a dedicated structure for shaping its light emission characteristics. This dedicated optical structure may be a lens or a mirror. For example, each LED can be provided with a mirror that brings the light emission of the LED into a desired shape via total internal reflection. In this case, each of the elements 50 and 60 can be a combination of an LED with a dedicated optical structure. It is further pointed out that it is also possible that each LED has a dedicated optical structure, with further optical elements, such a lens cover, being provided in addition.

The light unit 40 further comprises a control unit 70 that is connected to the LEDs via the mounting structures 52, 62 and 64. The control unit is adapted to selectively switch on/off the first subset of LEDs 60 and the second subset of LEDs 50. In particular, it is possible that the control unit separately controls the respective LEDs of each of the mounting structures 52, 62 and 64. In this way, wing engine scan, wing scan, and winglet illumination functionality can be switched on/off separately. In this way, the light unit 40 is flexible with respect to momentary illumination and/or scan requirements. It is also possible to keep the dissipated power within pre-set power limits. For example, it is possible to provide either wing and wing engine scan functionality or winglet illumination functionality at any given point in time. In this way, winglet illumination only has to be interrupted during wing and wing engine scan cycles, which are commonly very rare. In this way, the power requirement of the light unit 40 is kept low, while winglet illumination is made possible at most points in time.

The control unit 70 may also be coupled to actuators in the mounting structures 52, 62 and 64, which actuators are adapted to alter the orientation of the mounting structures. In this way, the control unit 70 can cause the illumination direction of the first subset of LEDs 60 and the second subset of LEDs 70 to change. In this way, the light unit 40 may adapt the illumination of the wing, the wing engine and the winglet to momentary changes in position, such as caused by wing flex during flight of the aircraft. For this purpose the control unit 70 may be coupled to sensor arrangements sensing the wing flex of the aircraft wing.

Figure 3:
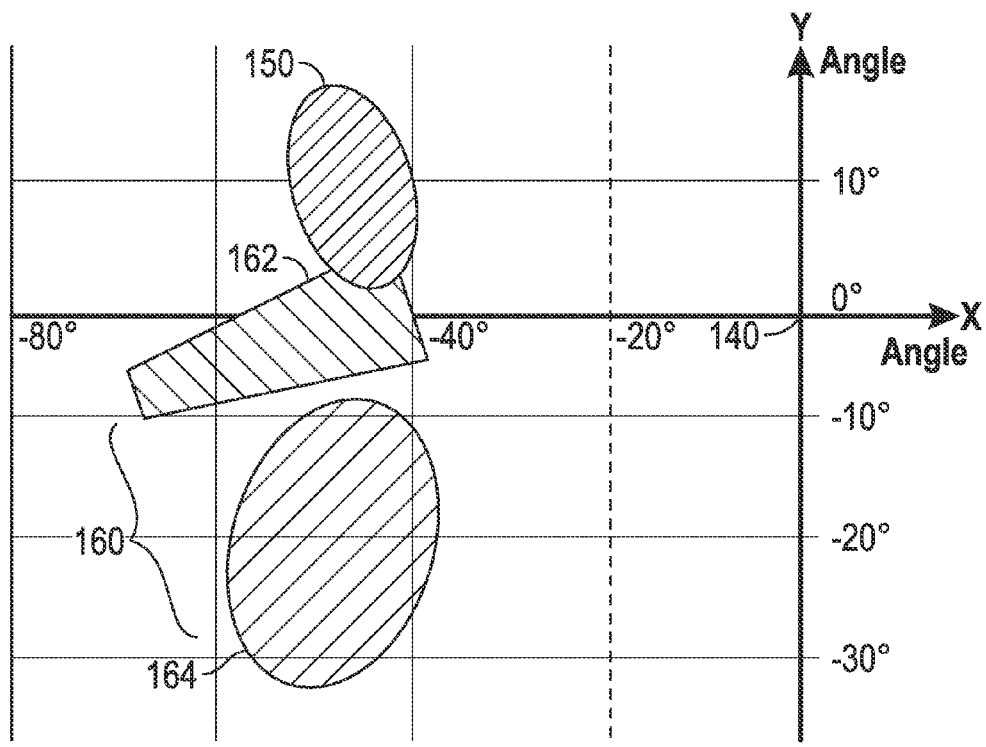
FIG. 3 shows a light intensity distribution of the combined wing scan and winglet illumination light unit of FIG. 2.

FIG. 3 shows an illumination distribution of the light unit 40 of FIG. 2. In particular, a first illumination region 160 for illuminating the wing and the wing engine, caused by the first subset of LEDs 60, and a second illumination region 150 for illuminating the wing tip winglet, caused by the second subset of LEDs 50, is shown. These illumination regions 150 and 160 are illustrated in terms of their respective angles with respect to a reference light emission direction 140. The reference light emission direction 140, which extends into the drawing plane at the intersection of the two axes shown, is horizontal and has a 90° angle with respect to the front-rear direction of the airplane in the present embodiment. In other words, the reference light emission direction 140 is straight left.

If the light unit 40 is disposed at the broadest position of the fuselage 12, the reference light emission direction may be normal to the lens cover 42 of the light unit 40. However, the reference light emission direction may also be at an angle with respect to the lens cover 42. It is pointed out that the reference light emission direction is a question of definition and does not necessarily have an underlying meaning with respect to the light unit and/or aircraft framework.

The x-axis of FIG. 3 denotes the front-rear angle of the illumination regions with respect to the reference light emission direction, with negative values denoting angles towards the rear. In other words, the x-axis is a cross-section of a horizontal reference plane. The y-axis illustrates the top-bottom angle of the illumination regions with respect to the reference light emission direction, with negative values denoting angles towards the bottom. In other words, the y-axis is a cross-section of a vertical reference plane.

The first illumination region 160 is comprised of a wing illumination region 162 and a wing engine illumination region 164. The wing illumination region 162 extends approximately between 35° and 70° towards the rear and approximately between 5° to the top and 10° towards the bottom. The engine illumination region 164 extends approximately between 35° and 60° towards the rear and 5° and 35° towards the bottom.

It is explicitly pointed out that it is not necessary that the first illumination region 160 is comprised of two distinct regions, namely the wing illumination region 162 and the wing engine illumination region 164. It is also possible that a larger illumination region covers much or most of the angular range between 5° to the top and 35° towards the bottom and between 35° to 70° towards the rear for jointly illuminating the wing and the wing engine. With the optical structure(s) being provided for shaping the light emission distribution, a large variety of light emission distributions can be achieved, with the particular light emission distribution of the particular light unit 40 being adapted to the particular usage requirements.

Particular attention is drawn to the fact that the first illumination region 160 and the second illumination region 150 are angled more than 20° towards the rear from the reference light emission direction, with the 20° to the rear direction being indicated by a dashed line in FIG. 3. In this way, it is ensured that light from the first subset of LEDs 60 and the second subset of LEDs 50 is at an angle of more than 110° with respect to the rear-to-front direction of the airplane and therefore contributes to the rear light emission of the airplane. According to the Federal Aviations Regulation (FAR), the rear light of a plane has to be white and is required to be within an angle of not more 70° with respect to the front-to-rear direction of the plane.

It is pointed out that the second illumination region 150 covers a fairly small angular range, resulting in a very focussed and therefore very efficient means of illuminating the wing tip winglet. In this way, not much light of the second subset of LEDs 50 passes the winglet in a wasteful manner.

It is also pointed out that the edges of the illumination regions 150, 162 and 164 of FIG. 3 do not require zero light emission to their outside. The edges represent a borderline where the illumination drops to a threshold value with respect to the point of highest light intensity within the respective illumination regions. This threshold may for example be 5% of the highest light intensity within the respective illumination regions.

In the present exemplary embodiment, the second illumination region 150 has a light intensity that is at least four times the light intensity of the first illumination region 160 (when measured immediately after leaving the light unit 40). This higher light intensity accounts for the geometric condition that the winglet is about twice as far away from the light unit 40 as the wing engine and the wing portion around the wing engine. As the light intensity of a light source drops with the square of the distance, above discussed relationship between the light intensities allows for comparable illumination of the wing engine and the winglet in the present exemplary embodiment. In this way, similar visibility can be ensured for wing engine and wing scan purposes as well as for winglet illumination purposes.

Exemplary embodiments of the invention allow for the integration of winglet illumination capacity with wing and wing engine scan functionality in combined wing scan and winglet illumination light units. Winglet illumination is achieved without the provision of additional light units, with low power and space requirements. Winglet illumination allows for efficient use of the winglet inner side for logo or advertisement placing as well as for visual inspection of the integrity and icing state of the winglets by the pilot or crew during flight.

According to a further embodiment, the first illumination region and the second illumination region are each defined in terms of angles with respect to a reference light emission direction, with the angles being defined in a front-rear reference plane and in a top-bottom reference plane. In this way, the combined wing scan and winglet illumination light unit may be easily adapted to aircraft lighting regulations, which usually define required and/or allowed light emission outputs in terms of angles. The top-bottom reference plane may be orthogonal to the front-rear reference plane. Further in particular, the front-rear reference plane may be a horizontal plane, while the top-bottom reference plane may be a vertical plane. The expression "defined in terms of angles" generally refers to angular ranges that are defined for the first and second illumination regions.

According to a further embodiment, the second illumination region extends more towards the top than the first illumination region and the first illumination region extends more towards the bottom than the second illumination region. In other words, the lowest point of the first illumination region is angled more towards the bottom than the lowest point of the second illumination region, and the highest point of the second illumination region is angled more towards the top than the highest point of the first illumination region. The first and second illumination regions may overlap in one or both of their angular ranges in the front-rear reference plane and the top-bottom reference plane. However, it is also possible that the angular ranges do not overlap, in particular in the top-bottom reference plane. The second illumination region may be angled more towards the top for a brighter illumination of the winglet, which is generally disposed higher than the wing and the wing engine. The first illumination region may extend more towards the front for a good illumination of the front edge of the wing engine, which often is susceptible to ice build-up.

According to a further embodiment, the first illumination region is within a first angular region having a first angle of between 30° and 70° towards the rear and a second angle of between 10° towards the top and 40° towards the bottom and wherein the second illumination region is within a second angular region having a third angle of more than 30° towards the rear and a fourth angle more than 0° towards the top. This angular distribution of the first and second illumination regions allows for an excellent trade-off between effective illumination of the wing, the wing engine and the winglet, efficient power use and conformity with aviation regulations. More in particular, the second angular region may have the third angle of between 35° and 55° towards the rear and the fourth angle of between 0° and 20° towards the top.

According to a further According to a further embodiment, the second illumination region has an opening angle of less than 15° both in the front-rear reference plane and the top-bottom reference plane. According to a particular embodiment, the second illumination region has an opening angle of less than 10°, in particular of less than 5° both in the front-rear reference plane and the top-bottom reference plane. In this way, a focussed and power-efficient illumination of the winglet is achieved. Moreover, little light scatter passes the winglet and has to be accounted for in satisfying regulatory light emission requirements.

According to a further embodiment, the combined wing scan and winglet illumination light unit is adapted for being installed in an aircraft in such a way that the reference light emission direction is horizontal and orthogonal to a longitudinal extension direction of an aircraft fuselage, with the first and second illumination regions being angled more than 20° towards the rear from the reference light emission direction. Being horizontal and being orthogonal to the longitudinal extension direction of the aircraft fuselage, the reference light emission direction is either left or right, i.e. either +90° or −90° with respect to the rear-to-front direction of the aircraft. In this way, exterior light regulations, which are usually given in angular values with respect to the rear-to-front direction of the aircraft, may be easily converted into the reference direction framework. It is pointed out that the reference light emission direction is a question of definition and does not necessarily relate to any particular orientation of the light unit. However, it is possible that the reference light emission direction, as defined in this paragraph, is orthogonal to a cover of the light unit. The angle of more than 20° towards the rear allows for the usage of white light in the combined wing scan and winglet illumination light unit, while conforming with regulatory requirements, as discussed above. The scatter light contributes to the white rear light of the plane.

According to a further embodiment, the combined wing scan and winglet illumination light unit has a first light intensity in the first illumination region and a second light intensity in the second illumination region, with the second light intensity being at least 4 times greater than the first light intensity. In this way, the greater distance of the winglet from the light unit is accounted for. The first and second light intensities are measured upon leaving the light unit. A 4 times greater light intensity allows for an equally bright illumination for a structure that is twice as far away. In this way, a comparable illumination between the wing engine and the wing tip winglet, which is twice as far away, is achieved. It is also possible to provide for a brighter illumination of the winglet. In a particular embodiment, the second light intensity is 6 to 10 times greater than the first light intensity.

According to a further embodiment, the at least one LED comprises a plurality of LEDs, with a first subset of the plurality of LEDs being arranged for illuminating the wing and the wing engine of the aircraft and a second subset of the plurality of LEDs being arranged for illuminating the wing tip winglet of the aircraft. The term "subset" is intended to include any number of LEDs, i.e. one or two or three or more LEDs. Accordingly, it is possible that the light unit comprises one LED for illuminating the wing and the wing engine and one LED for illuminating the wing tip winglet. It is, however, also possible that more LEDs are provided for one or the other or both of these tasks. The first subset and the second subset may have the same or different numbers of LEDs. They also may have the same or different kinds of LEDs. It is explicitly pointed out that it is also possible that all LEDs contribute to the illumination of both the wing/wing engine as well as the winglet. In this case, the at least one optical structure may achieve the desired light emission distribution having the first and second illumination regions.

The at least one optical structure may comprise one or more lenses, one or more reflectors, one or more shutters, or any suitable combination of these elements for achieving the desired light emission distribution.

According to a further embodiment, the first subset of the plurality of LEDs and the second subset of the plurality of LEDs can be switched on/off separately. In this way, the illumination by the light unit can be individually adapted to the present illumination requirements at any point in time. This leads to power only being consumed for the desired illumination at any point in time. The amount of power undesirably spent can be kept low.

According to a further embodiment, at most one of the first subset of the plurality of LEDs and the second subset of the plurality of LEDs is switched on at any given time. In other words, the first subset of the plurality of LEDs and the second subset of the plurality of LEDs are never switched on at the same point in time. By providing this limitation, the maximum power consumption of the combined wing scan winglet illumination light unit can be kept low, such that the light unit is only a small load for the general aircraft power supply system.

According to a further embodiment, the at least one optical structure comprises a first optical structure and a second optical structure, with the first optical structure being associated with the first subset of the plurality of LEDs for shaping the light emission distribution in the first illumination region and the second optical structure being associated with the second subset of the plurality of LEDs for shaping the light emission distribution in the second illumination region. By providing dedicated optical structures for shaping the light emission distribution in the first illumination region and the second illumination region, these optical structures may be freely designed, such that they can achieve the desired emission characteristics with a low number of optical components and/or low component complexity. Entirely separate optical subsystems are provided, which may also be exchanged easily and separately in the case of a failure. Each optical structure may have one or more optical elements, with the optical elements being taken from the group consisting of lenses, reflectors, shutters and other optical elements.

It is also possible that each LED of the plurality of LEDs has its own optical structure provided therewith. The optical structure shapes the light emission characteristics of the LED in question. In addition, one or more further optical structures may be provided for a further adaptation of the light emission distribution. For example, it is an option to provide each LED with a dedicated optical structure, such as a dedicated lens or a dedicated reflector, and to provide the transparent cover of the light unit as a separate lens for "fine-tuning" of the light emission distribution.

According to a further embodiment, the first illumination region comprises a wing illumination region for illuminating the wing of the aircraft and a wing engine illumination region for illuminating the wing engine of the aircraft. In this way, the wing and the wing engine can be illuminated in separately optimized ways. In particular, the light intensity and extension of the respective illumination regions may be specifically adapted to the requirements of inspecting the wing engine and the wing front edge. Also, the LED(s) for the wing engine illumination region and the LED(s) for the wing illumination region may be different and may be separately switched on/off. In this way, power-conscious switching of the wing engine scan functionality and the wing scan functionality can be achieved. The angular regions of the wing engine illumination region and the wing illumination region may be completely separate or may overlap.

In a particular embodiment, the peak intensity of the wing illumination region may be 2-4 times the peak intensity of the wing engine illumination region. Further, the peak intensity of the winglet illumination region, i.e. of the second illumination region, may be 20-30 times the peak intensity of the wing engine illumination region. Exemplary intensity values are 2000-2500 cd for the peak intensity of the wing engine illumination region, 5000-8000 cd for the peak intensity of the wing illumination region, and 40000-60000 cd for the peak intensity of the winglet illumination region.

According to a further embodiment, the combined wing scan and winglet illumination light unit has at least one actuator for changing an emission direction of the at least one LED, with the actuator being adapted to change the emission direction to account for wing flex during flight of the aircraft. In this way, illumination of the respective elements to be illuminated can be ensured in all flight conditions, even when the wings flex due to thermodynamic and other loads and stresses, which are induced during the flight.

According to a further embodiment, a visible portion of the combined wing scan and winglet illumination light unit is between 5 and 30 cm, in particular between 15 and 25 cm, in a first dimension and between 5 and 30 cm, in particular between 10 and 20 cm in a second dimension. The term "visible" portion refers to the portion of the light unit that is visible from the outside of the aircraft, when the light unit is assembled in the aircraft.

According to a further embodiment, the combined wing scan and winglet illumination light unit has a power consumption of between 5 and 70 W, in particular of between 20 and 40 W.

According to a further embodiment, when a left and right combined wing scan and winglet illumination light units are arranged in the aircraft, the respective first and second illumination regions of each of the left side and the right side combined wing scan and winglet illumination light units have an angle of more than 110° with respect to a rear-to-front direction of the aircraft fuselage. In this way, white light can be used for the second illumination region, while conforming with the Federal Aviation Regulations.

According to a further embodiment, the left side and the right side combined wing scan and winglet illumination light units are respectively positioned between 40% and 60% of the distance from the nose of the aircraft to a respective root of the left and right wings of the aircraft. These positions allow for a particularly good trade-off between illuminating the wing, wing engine and winglet at a favorable angle, placing the light units close to the wings for power-efficient illumination, and conforming with regulatory requirements.

According to a further embodiment, each of the left side and the right side combined wing scan and winglet illumination light units has a first light intensity in the first illumination region and a second light intensity in the second illumination region, with the second light intensity being at least 4 times, in particular 6 to 10 times greater than the first light intensity.

According to a further embodiment, each of the left side and the right side combined wing scan and winglet illumination light units has a plurality of LEDs, with a first subset of the plurality of LEDs being arranged for illuminating the wing and the wing engine of the aircraft and a second subset of the plurality of LEDs being arranged for illuminating the wing tip winglet of the aircraft, wherein the first subset of the plurality of LEDs and the second subset of the plurality of LEDs can be switched on/off separately.

It is explicitly pointed out that all features and embodiments described above with respect to the combined wing scan and winglet illumination light unit itself are equally applicable to the light unit, when in an assembled state in the aircraft, and to the aircraft as a whole. Accordingly, all modifications of the light unit also relate to the aircraft having a left and a right wing scan and winglet illumination light unit.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teaching of the invention without departing from the essential scope thereof. Therefore, it is intended that the invention not be limited to the particular embodiments disclosed, but that the invention will include all embodiments falling within the scope of the appended claims.

The invention claimed is:

1. A combined wing scan and winglet illumination light unit, comprising
    at least one LED and
    at least one optical structure for shaping a light emission distribution of the combined wing scan and winglet illumination light unit,
    wherein the light emission distribution comprises a first illumination region for illuminating a wing and a wing engine of an aircraft and a second illumination region for illuminating a wing tip winglet of the aircraft.

2. The combined wing scan and winglet illumination light unit of claim 1, wherein the first illumination region and the second illumination region are each defined in terms of angles with respect to a reference light emission direction, with the angles being defined in a front-rear reference plane and in a top-bottom reference plane.

3. The combined wing scan and winglet illumination light unit of claim 2, wherein the second illumination region extends more towards the top than the first illumination region and wherein the first illumination region extends more towards the bottom than the second illumination region.

4. The combined wing scan and winglet illumination light unit of claim 2, wherein the first illumination region is within a first angular region having a first angle of between 30° and 70° towards the rear and a second angle of between 10° towards the top and 40° towards the bottom and wherein the second illumination region is within a second angular region having a third angle of more than 30° towards the rear and a fourth angle more than 0° towards the top.

5. The combined wing scan and winglet illumination light unit of claim 2, wherein the second illumination region has an opening angle of less than 15° both in the front-rear reference plane and the top-bottom reference plane.

6. The combined wing scan and winglet illumination light unit of claim 5, wherein the second illumination region has an opening angle of less than 10° both in the front-rear reference plane and the top-bottom reference plane.

7. The combined wing scan and winglet illumination light unit of claim 2, adapted for being installed in an aircraft in such a way that the reference light emission direction is horizontal and orthogonal to a longitudinal extension direction of an aircraft fuselage, with the first and second illumination regions being angled more than 20° towards the rear from the reference light emission direction.

8. The combined wing scan and winglet illumination light unit of claim 1, having a first light intensity in the first illumination region and a second light intensity in the second illumination region, with the second light intensity being at least 4 times greater than the first light intensity.

9. The combined wing scan and winglet illumination light unit of claim 1, wherein the at least one LED comprises a plurality of LEDs, with a first subset of the plurality of LEDs being arranged for illuminating the wing and the wing engine of the aircraft and a second subset of the plurality of LEDs being arranged for illuminating the wing tip winglet of the aircraft.

10. The combined wing scan and winglet illumination light unit of claim 9, wherein the first subset of the plurality of LEDs and the second subset of the plurality of LEDs can be switched on/off separately.

11. The combined wing scan and winglet illumination light unit of claim 10, wherein at most one of the first subset of the plurality of LEDs and the second subset of the plurality of LEDs is switched on at any given time.

12. The combined wing scan and winglet illumination light unit of claim 9, wherein the at least one optical structure comprises a first optical structure and a second optical structure, with the first optical structure being associated with the first subset of the plurality of LEDs for shaping the light emission distribution in the first illumination region and the second optical structure being associated with the second subset of the plurality of LEDs for shaping the light emission distribution in the second illumination region.

13. The combined wing scan and winglet illumination light unit of claim 1, wherein the first illumination region comprises a wing illumination region for illuminating the wing of the aircraft and a wing engine illumination region for illuminating the wing engine of the aircraft.

14. The combined wing scan and winglet illumination light unit of claim 1, further having at least one actuator for changing an emission direction of the at least one LED, with the actuator being adapted to change the emission direction to account for wing flex during flight of the aircraft.

15. Aircraft with an aircraft fuselage, extending from a nose to a tail of the aircraft, a left wing and a right wing, with the left wing and the right wing each comprising a wing engine and a wing tip winglet, The aircraft further comprising a left side combined wing scan and winglet illumination light unit, disposed between the nose and the left wing on a left side of the aircraft fuselage, and a right side combined wing scan and winglet illumination light unit, disposed between the nose and the right wing on a right side of the aircraft fuselage, wherein each of the left side and the right side combined wing scan and winglet illumination light units has a first illumination region for illuminating the respective wing and wing engine and a second illumination region for illuminating the respective wing tip winglet.

16. Aircraft according to claim 15, wherein the respective first and second illumination regions of each of the left side and the right side combined wing scan and winglet illumination light units have an angle of more than 110° with respect to a rear-to-front direction of the aircraft fuselage.

17. Aircraft according to claim 15, wherein the left side and the right side combined wing scan and winglet illumination light units are respectively positioned between 40% and 60% of the distance from the nose of the aircraft to a respective root of the left and right wing of the aircraft.

18. Aircraft according to claim 15, wherein each of the left side and the right side combined wing scan and winglet illumination light units has a first light intensity in the first illumination region and a second light intensity in the second illumination region, with the second light intensity being at least 4 times greater than the first light intensity.

19. Aircraft according to claim 15, wherein each of the left side and the right side combined wing scan and winglet illumination light units has a plurality of LEDs, with a first subset of the plurality of LEDs being arranged for illuminating the wing and the wing engine of the aircraft and a second subset of the plurality of LEDs being arranged for illuminating the wing tip winglet of the aircraft, wherein the first subset of the plurality of LEDs and the second subset of the plurality of LEDs can be switched on/off separately.

20. Method of replacing a used wing engine scan light (WESL) of an aircraft with a combined wing scan and winglet illumination light unit, the combined wing scan and winglet illumination light unit comprising:
at least one LED and
at least one optical structure for shaping a light emission distribution of the combined wing scan and winglet illumination light unit,
wherein the light emission distribution comprises a first illumination region for illuminating a wing and a wing engine of an aircraft and a second illumination region for illuminating a wing tip winglet of the aircraft.

* * * * *